US011905911B2

(12) United States Patent
Suzuki et al.

(10) Patent No.: US 11,905,911 B2
(45) Date of Patent: Feb. 20, 2024

(54) INTERNAL COMBUSTION ENGINE

(71) Applicant: TOYOTA JIDOSHA KABUSHIKI KAISHA, Toyota (JP)

(72) Inventors: Yuki Suzuki, Kariya (JP); Tomihisa Tsuchiya, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/341,323

(22) Filed: Jun. 26, 2023

(65) Prior Publication Data

US 2024/0003313 A1 Jan. 4, 2024

(30) Foreign Application Priority Data

Jun. 29, 2022 (JP) ................................ 2022-104843

(51) Int. Cl.
*F02F 1/42* (2006.01)
*F01L 3/02* (2006.01)
*F02F 1/24* (2006.01)

(52) U.S. Cl.
CPC .............. *F02F 1/4235* (2013.01); *F01L 3/02* (2013.01); *F02F 1/4214* (2013.01); *F02F 2001/245* (2013.01)

(58) Field of Classification Search
CPC .. F02F 1/4235; F02F 1/4214; F02F 2001/245; F01L 3/02
See application file for complete search history.

(56) References Cited

U.S. PATENT DOCUMENTS 1,993,155 A * 3/1935 Faber, Jr. .............. F02F 1/4235 123/188.14
2001/0037797 A1* 11/2001 Arai .................... F02D 13/0215 123/480
2011/0030642 A1 2/2011 Nishida et al.

FOREIGN PATENT DOCUMENTS

JP 2011-038438 A 2/2011
JP 2021-095899 A 6/2021
KR 20040099551 A * 12/2004

* cited by examiner

*Primary Examiner* — Syed O Hasan
(74) *Attorney, Agent, or Firm* — Finnegan, Henderson, Farabow, Garrett & Dunner, LLP

(57) ABSTRACT

A guiding portion of an intake valve head includes a specific tangent line, which, when the intake valve is in a fully open state, intersects with at least one selected from an ignition plug and a closed exhaust valve. A line segment that agrees with a tangent line contacting the guiding portion and extends from a contact point of the tangent line with the guiding portion to an intersection point of the tangent line with a central axis of the head is defined as a first line segment, a line segment that agrees with the central axis and extends from the intersection point toward the intake passage is defined as a second line segment, and an angle formed by the first second line segments is defined as a specific angle. The tangent line that minimizes the specific angle is the specific tangent line.

5 Claims, 3 Drawing Sheets

INTERNAL COMBUSTION ENGINE

BACKGROUND

1. Field

The present disclosure relates to an internal combustion engine.

2. Description of Related Art

Japanese Laid-Open Patent Publication No. 2021-95899 discloses an internal combustion engine that includes a cylinder, an intake passage, and a water injection valve. Air-fuel mixture of intake air and fuel is burned in the cylinder. The intake passage is connected to the cylinder. The water injection valve is located inside the intake passage. The water injection valve injects water toward the cylinder.

The internal combustion engine as described in the above publication includes an exhaust passage for discharging exhaust gas, and is provided with an exhaust valve and an ignition plug. The exhaust valve opens and closes an end portion of the exhaust passage connected to the cylinder. The ignition plug ignites the air-fuel mixture by spark discharge.

In the internal combustion engine described in the above publication, water injected from the water injection valve is unlikely to collect on the ignition plug and the exhaust valve. Therefore, the ignition plug and the exhaust valve cannot be cooled efficiently.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an internal combustion engine includes a cylinder including an intake opening and an exhaust opening, an ignition plug including a distal end located inside the cylinder, an intake passage connected to the intake opening of the cylinder, an exhaust passage connected to the exhaust opening of the cylinder, a water injection valve located inside the intake passage. The water injection valve is configured to inject water into the intake passage. The internal combustion engine further includes an intake valve configured to selectively open and close the intake opening, and an exhaust valve configured to selectively open and close the exhaust opening. The intake valve includes a rod-shaped stem and a head that is connected to a distal end of the stem and located inside the cylinder. An outer surface of the head includes an upper surface facing the intake opening. The upper surface includes a curved guiding portion. The guiding portion includes a specific tangent line that, when the intake valve is in a fully open state, intersects with at least one selected from a portion of the ignition plug that is located inside the cylinder, and a portion of the exhaust valve in a closed state that is located inside the cylinder. On an imaginary cross section that is parallel to a central axis of the head and passes through the guiding portion, a line segment that agrees with a tangent line contacting the guiding portion and extends from a contact point of the tangent line with the guiding portion to an intersection point of the tangent line with the central axis is defined as a first line segment, and a line segment that agrees with the central axis and extends from the intersection point toward the intake passage is defined as a second line segment. An angle formed by the first line segment and the second line segment is defined as a specific angle. The tangent line that minimizes the specific angle is the specific tangent line.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An internal combustion engine 10 according to one embodiment will now be described with reference to the drawings.

<Internal Combustion Engine>

Figure 1:
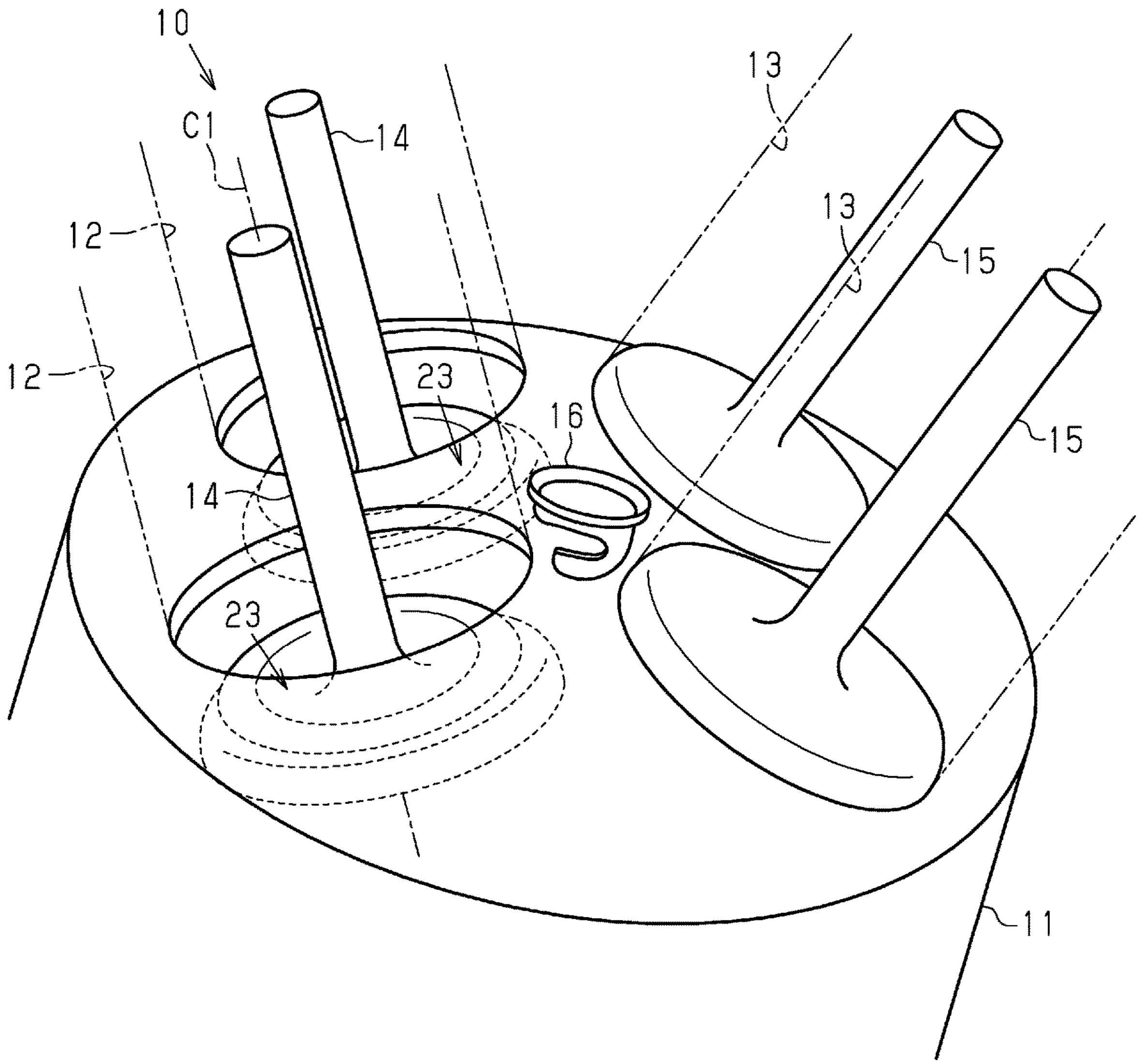
FIG. 1 is a schematic diagram showing a configuration of an internal combustion engine.

As shown in FIG. 1, the internal combustion engine 10 includes four cylinders 11 (only one is shown), an intake passage 12, and an exhaust passage 13.

Each cylinder 11 is a space for burning an air-fuel mixture of fuel and intake air. The cylinder 11 has a substantially cylindrical shape. The cylinder 11 has four openings. When viewed from a direction along the axis of the cylinder 11, the four openings are arranged in two rows and two columns. The four openings include two intake openings and two exhaust openings.

The intake passage 12 is a passage through which intake air flows. A downstream portion of the intake passage 12 is branched into eight passages. Two of the eight branched passages are connected to each of the cylinders 11. The two branched passages are connected to the two intake openings of each cylinder 11.

The exhaust passage 13 is a passage through which exhaust gas flows. An upstream portion of the exhaust passage 13 is branched into eight passages. Two of the eight branched passages are connected to each of the cylinders 11. The two branched passages are connected to the two exhaust openings of each cylinder 11.

The internal combustion engine 10 includes eight intake valves 14 and eight exhaust valves 15. FIG. 1 illustrates two intake valves 14 and two exhaust valves 15 that are provided for one cylinder 11.

The intake valves 14 are located at connection points between the intake passage 12 and the cylinder 11. The intake valves 14 open and close the intake openings of the cylinder 11.

Figure 2:
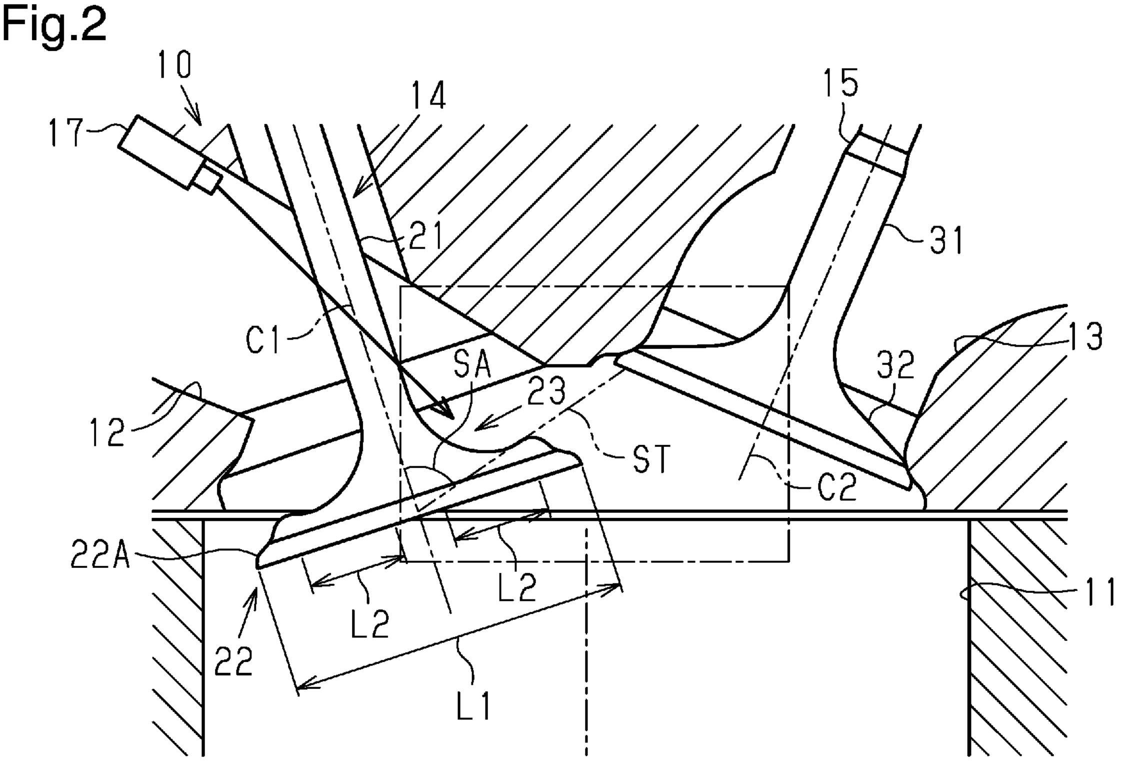
FIG. 2 is a partial cross-sectional view of the internal combustion engine of FIG. 1, illustrating a cylinder and its surrounding structure.
Figure 3:
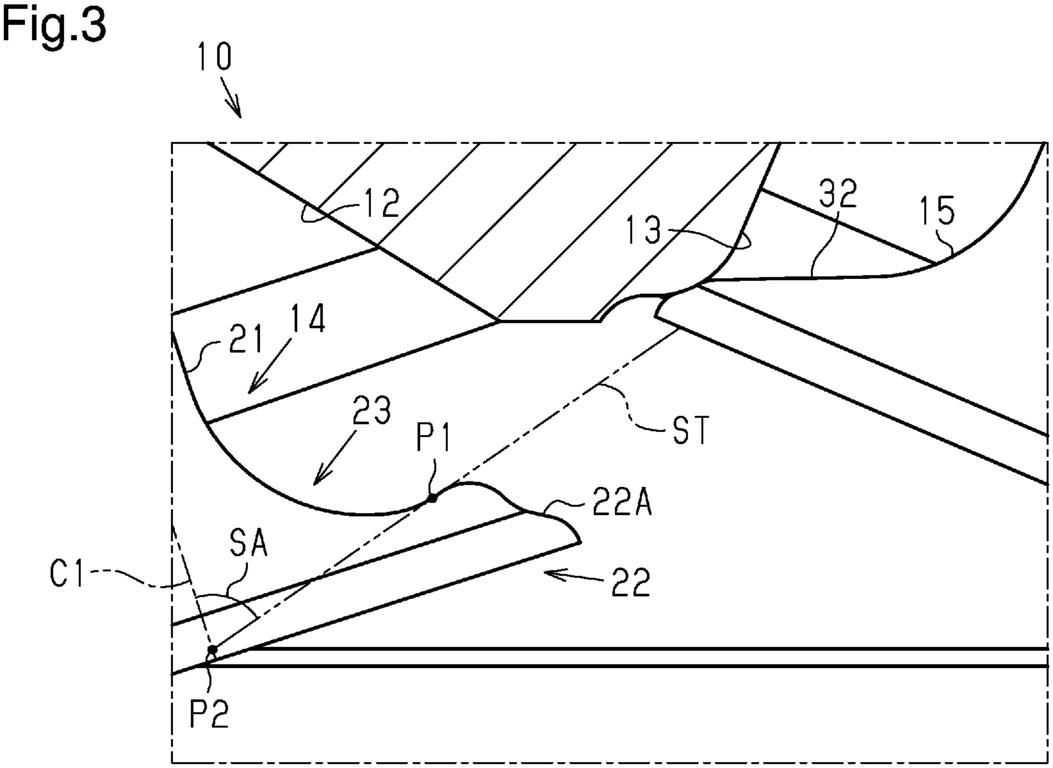
FIG. 3 is an enlarged partial cross-sectional view of FIG. 2.

As shown in FIGS. 2 and 3, each intake valve 14 includes a stem 21 and a head 22. The stem 21 is rod-shaped. The head 22 is provided at a distal end of the stem 21 and is located inside the cylinder 11. When viewed in a direction along a central axis C1 of the stem 21, the head 22 has a circular shape. The central axis of the head 22 agrees with the central axis C1 of the stem 21. The specific shape of the head 22 will be described below.

The stem 21 is connected to a valve actuation mechanism (not shown). The intake valve 14 is operable in a direction along the central axis C1 of the stem 21 by force from the valve actuation mechanism. In response to this operation, the head 22 of the intake valve 14 opens and closes the intake passage 12 in the cylinder 11.

The intake valve 14 is movable between a closed position, at which the head 22 is closest to the intake opening, and a fully open position, at which the head 22 is farthest away from the intake opening. When the intake valve 14 moves to the closed position, the head 22 closes the intake opening. A state in which the head 22 closes the intake opening is referred to as a closed state of the intake valve 14.

When the intake valve 14 moves to the fully open position, the head 22 opens the intake opening to the maximum extent. A state in which the head 22 maximally opens the intake opening is referred to as a fully open state of the intake valve 14.

The exhaust valves 15 are located at connection points between the exhaust passage 13 and the cylinder 11. The exhaust valves 15 open and close the exhaust openings of the cylinder 11.

Each exhaust valve 15 includes a stem 31 and a head 32. The stem 31 is rod-shaped. The head 32 is provided at a distal end of the stem 31 and is located inside the cylinder 11. When viewed in a direction along a central axis C2 of the stem 31, the head 32 has a circular shape.

The stem 31 is connected to a valve actuation mechanism (not shown). The exhaust valve 15 is operable in a direction along the central axis C2 of the stem 31 by force from the valve actuation mechanism. In response to this operation, the head 32 of the exhaust valve 15 opens and closes the exhaust passage 13 in the cylinder 11.

The exhaust valve 15 is movable between a closed position, at which the head 32 is closest to the exhaust opening, and a fully open position, at which the head 32 is farthest away from the exhaust opening. When the exhaust valve 15 moves to the closed position, the head 32 closes the exhaust opening. A state in which the head 32 closes the exhaust opening is referred to as a closed state of the exhaust valve 15.

When the exhaust valve 15 moves to the fully open position, the head 32 opens the exhaust opening to the maximum extent. A state in which the head 32 maximally opens the exhaust opening is referred to as a fully open state of the exhaust valve 15.

As shown in FIG. 1, the internal combustion engine 10 includes four ignition plugs 16. FIG. 1 shows one ignition plug 16 provided for one cylinder 11. FIG. 1 shows only part of the ignition plug 16 including the tip is shown. The ignition plug 16 is located in a region surrounded by the four openings of the cylinder 11. Most of the ignition plug 16 is embedded in the internal combustion engine 10. The tip of the ignition plug 16 is located inside the cylinder 11. The ignition plug 16 ignites air-fuel mixture in the cylinder 11.

As shown in FIG. 2, the internal combustion engine 10 has four water injection valves 17. FIG. 2 shows one water injection valve 17 provided for one cylinder 11. FIG. 2 schematically illustrates the water injection valve 17 in the vicinity of the downstream end of the intake passage 12. The water injection valve 17 is connected to a water tank (not shown). The water injection valve 17 is supplied with water from the water tank.

The water injection valve 17 is located inside the intake passage 12. The water injection valve 17 injects water into the intake passage 12. The water injected from each water injection valve 17 flows into the corresponding one of the cylinders 11 together with the intake air. The water injected from each water injection valve 17 flows into two branched passages respectively connected to the two intake openings of the corresponding cylinder 11.

<Shape of Head of Intake Valve>

The intake valve 14 will now be described below. One of the cylinders 11 will now be described as a representative. Further, one of the two intake valves 14 corresponding to the cylinder 11 will be described as a representative.

As shown in FIG. 2, the outer surface of the head 22 of the intake valve 14 has an upper surface 22A facing the intake opening. The upper surface 22A includes a guiding portion (guiding surface) 23.

FIG. 2 shows a cross section of the internal combustion engine 10 taken along a plane including the central axis C1 of the stem 21 of the intake valve 14 and the central axis C2 of the stem 31 of the exhaust valve 15. This cross section will be referred to as an imaginary cross section. In the imaginary cross section, the guiding portion 23 is a portion in which the upper surface 22A is curved in a concave shape. In addition, in the imaginary cross section, the guiding portion 23 has a concave arcuate shape.

As shown in FIG. 1, the guiding portion 23 is provided in an annular shape around the central axis C1 when viewed in a direction along the central axis C1 of the stem 21. As shown in FIG. 2, the width dimension of the guiding portion 23 in a direction orthogonal to the central axis C1, that is, in the radial direction of the head 22 is represented by L2. The width dimension L2 of the guiding portion 23 is constant over 360° around the central axis C1. Therefore, the maximum width dimension of the guiding portion 23 in the direction orthogonal to the central axis C1 is equal to the width dimension L2.

As shown in FIG. 3, the guiding portion 23 is continuous with the outer surface of the stem 21. In the present embodiment, the outer surface of the stem 21 is a straight line on the imaginary cross section. On the imaginary cross section, a point at which a straight line defining the outer surface of the stem 21 and an arc defining the guiding portion 23 intersect with each other is a boundary between the stem 21 and the guiding portion 23. As described above, the guiding portion 23 has an annular shape. Therefore, on the imaginary cross section, the guiding portion 23 is located on the opposite sides of the stem 21 in a direction orthogonal to the central axis C1.

As shown in FIG. 2, the dimension of the head 22 in a direction orthogonal to the central axis C1, that is, an outer diameter is represented by L1. The width dimension L2 of the guiding portion 23 is, for example, one quarter or more of the outer diameter L1 of the head 22. In the present embodiment, the width dimension L2 of the guiding portion 23 is about one fourth of the outer diameter L1 of the head 22. As described above, on the imaginary cross section, the guiding portion 23 is located on the opposite sides of the stem 21 in a direction orthogonal to the central axis C1. Therefore, the total width dimension of the guiding portion 23 located on the opposite sides of the stem 21 occupies approximately one half of the outer diameter L1 of the head 22.

As shown in FIG. 3, the guiding portion 23 has a specific tangent line ST. The specific tangent line ST will be described below. On the imaginary cross section, an angle formed by a tangent line contacting the guiding portion 23 and the central axis C1 is referred to as a specific angle SA. Specifically, on the imaginary cross section, a line segment that agrees with the tangent line contacting the guiding portion 23 and extends from a contact point P1 of the tangent line with the guiding portion 23 to an intersection point P2 of the tangent line with the central axis C1 is defined as a first line segment, On the imaginary cross section, a line segment that agrees with the central axis C1 and extends from the intersection point P2 toward the intake passage 12 is defined as a second line segment. The specific angle SA is an angle formed by the first line segment and the second line segment. The specific tangent line ST is a tangent line that is in contact with the guiding portion 23 and that minimizes the specific angle SA. The specific angle SA, which is defined by the specific tangent line ST, is smaller than 90 degrees, for example.

In the present embodiment, the contact point P1 of the specific tangent line ST with the guiding portion 23 is located at the radially outer end of the guiding portion 23 on the imaginary cross section. When the intake valve 14 is in the fully open state, the specific tangent line ST intersects with a portion of the closed exhaust valve 15 that is located inside the cylinder 11. Specifically, the specific tangent line ST intersects with the head 32 of the closed exhaust valve 15, more specifically, with the surface of the head 32 facing the inside of the cylinder 11. The specific tangent line ST intersects with the head 32 of the exhaust valve 15 on the side of the stem 31 of the exhaust valve 15 on which the intake valve 14 is located.

Not only when the intake valve 14 is in the fully open state, but also when the intake valve 14 is in a specific opening degree range including the fully open state, the specific tangent line ST intersects with a portion of the head 32 of the closed exhaust valve 15 that is located inside the cylinder 11. Specifically, in a case in which the closed state corresponds to an opening degree of 0%, and the fully open state is corresponds to an opening degree 100%, the specific tangent line ST intersects with a portion of the closed exhaust valve 15 that is located inside the cylinder 11 when the intake valve 14 is at an opening degree in a range of about 75% to 100%.

As described above, the shape of the guiding portion 23 is determined such that the specific tangent line ST intersects with the portion of the head 32 of the closed exhaust valve 15 that is located inside the cylinder 11 when the intake valve 14 is in a specific opening degree range including the fully open state.

Operation of Present Embodiment

The water injection valve 17 injects water into the intake passage 12 depending on the operating state of the internal combustion engine 10. The injected water flows into the cylinder 11 through the space around the intake valve 14. The water flowing into the cylinder 11 reaches the upper surface 22A of the head 22 of the intake valve 14. The water that has reached the upper surface 22A of the head 22 flows along the upper surface 22A. That is, the water that has reached the upper surface 22A of the head 22 of the intake valve 14 flows along the guiding portion 23. The water is scattered from the guiding portion 23 at the contact point P1 of the specific tangent line ST with the guiding portion 23. The scattered water moves along the specific tangent line ST. That is, the guiding portion 23 functions as a ski jump for the water moving along the upper surface 22A.

Advantages of Present Embodiment (1) In the above-described embodiment, the water injected from the water injection valve 17 flows along the guiding portion 23 as described above. The water is scattered along the specific tangent line ST, and as a result, is guided to the exhaust valve Therefore, the injected water readily collides with the exhaust valve 15. Since the water is guided toward the exhaust valve 15, the exhaust valve 15 is cooled efficiently.

(2) If the curvature of the guiding portion 23 is large, the momentum of the water flowing along the upper surface 22A is likely to be attenuated in the guiding portion 23. The larger the area of the guiding portion 23 with respect to the head 22, the smaller the curvature of the curve can be made. Accordingly, the momentum of the water flowing along the upper surface 22A is less likely to be attenuated in the guiding portion 23. In the above-described embodiment, the width dimension L2 of the guiding portion 23 in the direction orthogonal to the central axis C1 is greater than or equal to a quarter of the outer diameter L1 of the head 22. Thus, according to the above-described embodiment, the guiding portion 23 is provided over a considerable region of the upper surface 22A of the head 22. Therefore, the momentum of the water is unlikely to be attenuated, and the water scattered from the head 22 readily reaches the exhaust valve 15.

(3) In the above-described embodiment, the guiding portion 23 is continuous with the outer surface of the stem 21 on the imaginary cross section. In other words, there is no step or the like at the boundary between the outer surface of the stem 21 and the upper surface 22A of the head 22. With this configuration, the boundary between the outer surface of the stem 21 and the upper surface 22A of the head 22 does not hinder the flow of water.

(4) A case is now considered in which the guiding portion 23 is not annular and is provided only in a partial angular range around the central axis C1. In this case, when the intake valve 14 is installed, it is necessary to adjust the position of the guiding portion 23 to be an appropriate position with respect to the exhaust valve 15. Further, it is necessary to prevent the installed intake valve 14 from rotating about the central axis C1. In contrast, in the above-described embodiment, the guiding portion 23 is provided in an annular shape around the central axis C1 when viewed in the direction along the central axis C1. Therefore, when the intake valve 14 is installed, it is not necessary to adjust the position of the guiding portion 23 as described above. Thus, the intake valve 14 is installed easily.

(5) With the above-described embodiment, not only when the intake valve 14 is in the fully open state, but also when the intake valve 14 is in the specific opening degree range, which includes the fully open state, the specific tangent line ST intersects with a portion of the exhaust valve 15 that is located inside the cylinder 11. Therefore, even in the process in which the intake valve 14 moves from the closed state to the fully open state, water is appropriately guided toward the exhaust valve 15 by the guiding portion 23.

<Modifications>

The above-described embodiment may be modified as follows. The above-described embodiment and the following modifications can be combined as long as the combined modifications remain technically consistent with each other.

In the above-described embodiment, the shape of the guiding portion 23 may be determined such that the specific tangent line ST intersects with the ignition plug 16.

Figure 4:
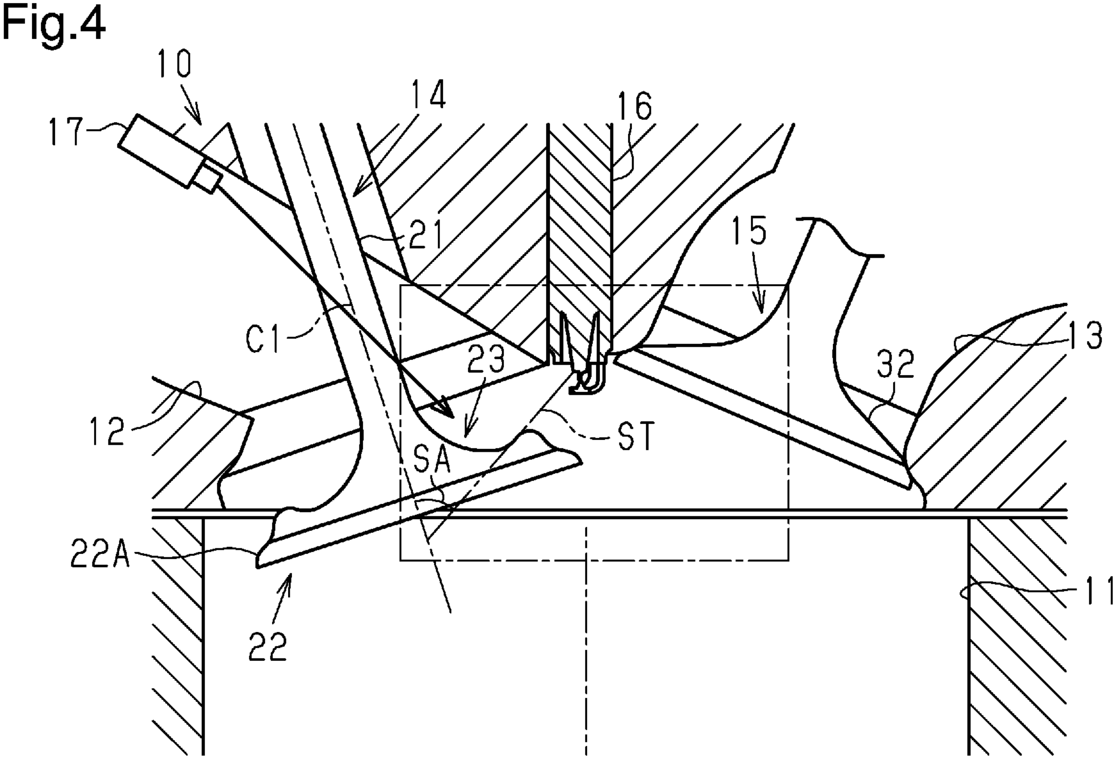
FIG. 4 is a partial cross-sectional view of an internal combustion engine according to a modification, illustrating a cylinder and its surrounding structure.

For example, a case is now considered in which, as shown in FIG. 4, a tangent line is drawn that contacts the guiding portion 23 on an imaginary cross section including the central axis C1 of the intake valve 14 and the central axis of the ignition plug 16. In this imaginary cross section, a tangent line that is in contact with the guiding portion 23 and minimizes the specific angle SA is the specific tangent line ST as in the case shown in FIG. 3. When the intake valve 14 is in the fully open state, the specific tangent line ST intersects with a portion of the ignition plug 16 that is located inside the cylinder 11. With this modification, water is scattered toward the ignition plug 16 in the same manner as described in the above-described advantage (1). The ignition plug 16 is thus cooled efficiently. Also in this modification, the specific tangent line ST may intersect with a portion of the ignition plug 16 that is located inside the cylinder 11 when the intake valve 14 is in the specific opening degree range, which includes the fully open state.

The configuration of the internal combustion engine 10 is not limited to that described in the above-described embodiment. For example, the number of the cylinders 11 may be different from that in the example of the above-described embodiment. In addition, the number of the water injection valves 17 is not limited to the example of the above-described embodiment.

In the above-described embodiment, the specific tangent line ST in the imaginary cross section including the central axis C1 of the stem 21 of the intake valve 14 and the central axis C2 of the stem 31 of the exhaust valve 15 have been described. However, another imaginary cross section may be employed. The specific tangent line ST may be drawn in a imaginary cross section that is parallel to the central axis C1 of the stem 21 and passes through the guiding portion 23. It is sufficient to provide at least one imaginary cross section in which the specific tangent line ST intersects with a portion of the exhaust valve 15 located inside the cylinder 11.

In the above-described embodiment, the width dimension L2 of the guiding portion 23 may be less than one fourth of the outer diameter L1 of the head 22. The width dimension L2 can be changed in accordance with the outer diameter L1 of the head 22, the radius of curvature of the arc of the guiding portion 23, the flow velocity of water injected from the water injection valve 17.

In the above-described embodiment, the guiding portion 23 does not necessarily need to be smoothly continuous with the outer surface of the stem 21. That is, an inclined surface, a step, or the like may exist between the stem 21 and the guiding portion 23.

In the above-described embodiment, the guiding portion 23 does not necessarily need to be provided annularly around the central axis C1. The guiding portion 23 may be modified if it formed in the head 22 at a position on a side of the central axis C1 closer to the exhaust valve 15.

On the imaginary cross section, the guiding portion 23 does not necessarily need to have an arcuate shape. The guiding portion 23 may have a linear portion on the imaginary cross section.

In the above-described embodiment, a configuration may be employed in which the specific tangent line ST intersects with a portion of the exhaust valve 15 that is located inside the cylinder 11, only when the intake valve 14 is in the fully open state.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An internal combustion engine, comprising: a cylinder including an intake opening and an exhaust opening; an ignition plug including a distal end located inside the cylinder; an intake passage connected to the intake opening of the cylinder; an exhaust passage connected to the exhaust opening of the cylinder; a water injection valve located inside the intake passage, the water injection valve being configured to inject water into the intake passage; an intake valve configured to selectively open and close the intake opening; and an exhaust valve configured to selectively open and close the exhaust opening, wherein the intake valve includes: a rod-shaped stem; and a head that is connected to a distal end of the stem and located inside the cylinder, an outer surface of the head includes an upper surface facing the intake opening, the upper surface includes a curved guiding portion, the guiding portion includes a specific tangent line that, when the intake valve is in a fully open state, intersects with at least one selected from a portion of the ignition plug that is located inside the cylinder, and a portion of the exhaust valve in a closed state that is located inside the cylinder, on an imaginary cross section that is parallel to a central axis of the head and passes through the guiding portion, a line segment that agrees with a tangent line contacting the guiding portion and extends from a contact point of the tangent line with the guiding portion to an intersection point of the tangent line with the central axis is defined as a first line segment, a line segment that agrees with the central axis and extends from the intersection point toward the intake passage is defined as a second line segment, and an angle formed by the first line segment and the second line segment is defined as a specific angle, and the tangent line that minimizes the specific angle is the specific tangent line, and the specific angle is less than 90°.

2. The internal combustion engine according to claim 1, wherein a maximum width dimension of the guiding portion in a direction orthogonal to the central axis is greater than or equal to a quarter of an outer diameter of the head.

3. The internal combustion engine according to claim 1, wherein on the imaginary cross section an outer surface of the stem is a straight line, and the guiding portion has a concave arcuate shape and is continuous with the outer surface of the stem.

4. The internal combustion engine according to claim 1, wherein the guiding portion is provided in an annular shape around the central axis when viewed in a direction along the central axis.

5. The internal combustion engine according to claim 1, wherein, when the intake valve is in a specific opening degree range including the fully open state, the specific tangent line intersects with at least one selected from the portion of the ignition plug located inside the cylinder and the portion of the exhaust valve in the closed state that is located inside the cylinder.

* * * * *